Figure 1:
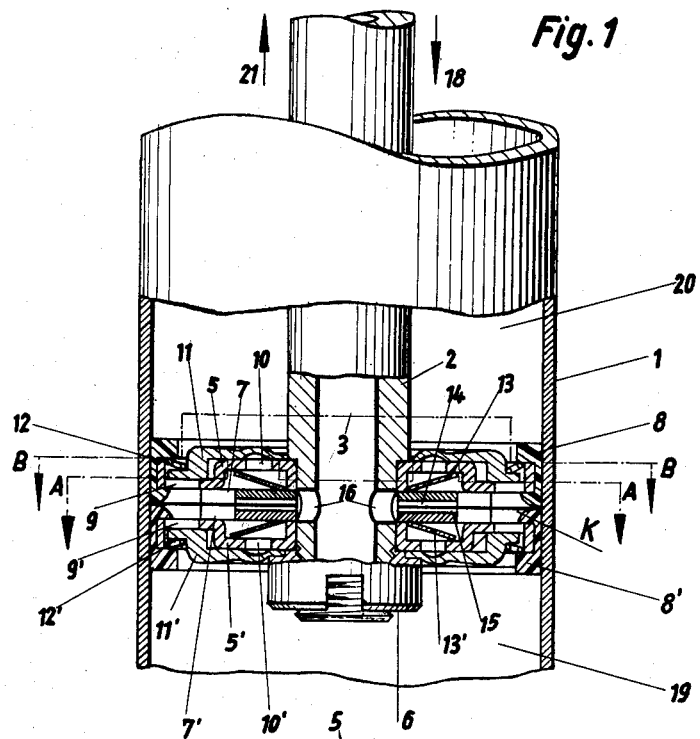

Feb. 5, 1963  W. ZEIDLER  3,076,529
HYDRAULIC SHOCK ABSORBER
Filed July 1, 1959  3 Sheets-Sheet 1

Inventor:
Willi Zeidler
By
Watson Cole Grindle + Watson
Attys.

Feb. 5, 1963  W. ZEIDLER  3,076,529
HYDRAULIC SHOCK ABSORBER
Filed July 1, 1959  3 Sheets-Sheet 2

Inventor:
Willi Zeidler
By
Watson, Cole, Grindle & Watson
Attys.

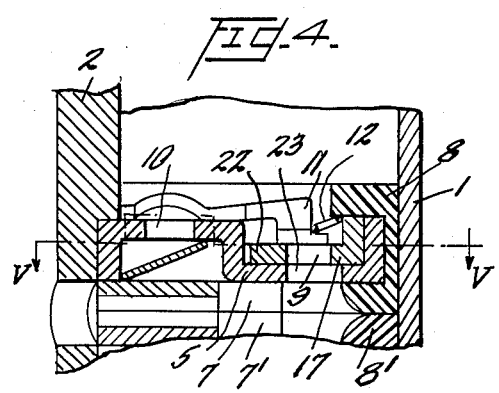
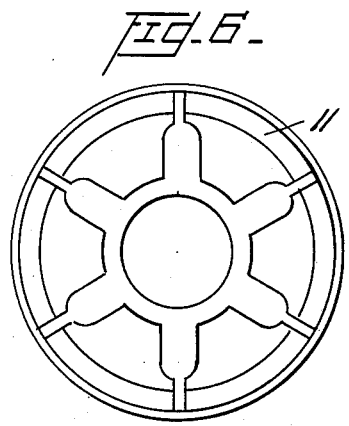
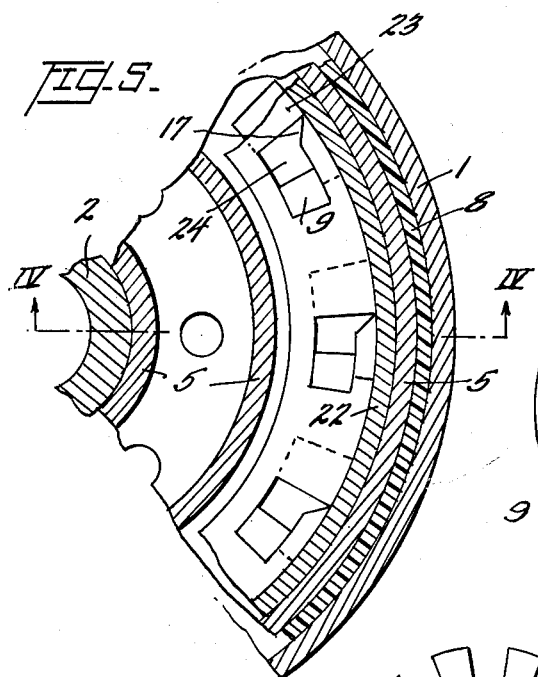
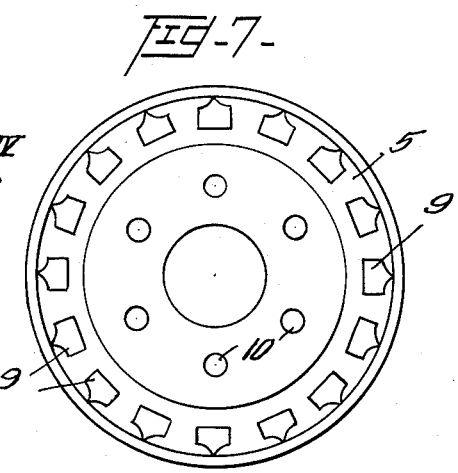
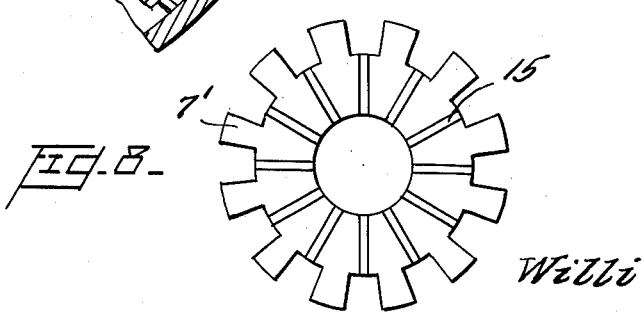

United States Patent Office 3,076,529
Patented Feb. 5, 1963

3,076,529
HYDRAULIC SHOCK ABSORBER
Willi Zeidler, Dusseldorf, Germany, assignor to Rheinmetall G.m.b.H., Dusseldorf, Germany
Filed July 1, 1959, Ser. No. 824,265
Claims priority, application Germany July 24, 1958
12 Claims. (Cl. 188—88)

The present invention relates to a mechanism for the control of the valves of hydraulic devices in accordance with temperature variations in which the differences in the coefficients of thermal expansion of various components of the valves are utilized in order to control the flow of liquid.

Various types of valve control mechanisms of this kind are known. However, the embodiments hitherto in use suffer from the disadvantage that, although they exert control in accordance with temperature variations, they do not enable the designer to determine the head loss of the valve in the various temperature ranges freely and in accordance with the required performance characteristics of the valve, or in other words to adapt the effective cross sectional area of flow of the valves to the requirements of the viscosity variations of the hydraulic liquid used in any particular case.

It is an object of the present invention to provide a valve of the type mentioned hereinbefore wherein the above mentioned requirements are satisfied and which in addition is suited for the special conditions and requirements met with in the application of valves of such types to dashpot assemblies, for example shock absorbers for road and rail vehicles.

Thus, cases are met with in the design of shock absorbers in which it is necessary that the damping effect, or in other words the loss of head due to flow through the valve assembly concerned, should be constant over a wide range of temperatures although the viscosity of the shock absorber liquid varies very markedly throughout such a range of temperatures.

In other cases, however, it may be necessary in the design of shock absorbers to provide a valve such that the loss of head due to flow through it is not constant or is not reduced when the shock absorber liquid temperature rises and its viscosity falls, but the said loss of head rises as well in that case. For if that is the case it becomes possible to compensate, by means of the shock absorber, certain shortcomings in the characteristics of leaf springs more particularly of motor cars, which are inter alia due to the fact that in the case of laminated springs the characteristic of a spring depends to a marked degree on the viscosity of the layers of lubricant filling the space between adjacent spring leaves and in contact with the spring shackles, and therefore on the ambient temperature.

The present invention provides a mechanism for the control of a hydraulic device in accordance with temperature variations comprising two valve members having different coefficients of thermal expansion of which one valve member is provided with passages whose effective cross sectional area is controlled by the other valve member.

In order to provide for large control travel distances for the valve discs it is preferable to manufacture the valve disc which is provided with the passages from a metal, for example steel, while the other control disc is made of plastic.

The construction according to the invention here described makes it possible for the designer for the first time to provide for any desired loss of head of the liquid flowing through the valve and hence for any damping characteristic of the valve appliance by suitably shaping the edges of the passages, and thus to adapt the damping mechanism exactly to the viscosity variations of the hydraulic liquid used in the apparatus.

Thus the designer is enabled to shape the said passages for example in such a manner that, as a result of the variations of diameter of the valve control discs within the relevant range of viscosities of the hydraulic liquid due to temperature variations, a loss of head of the liquid flowing through the valve is obtained which corresponds to the required characteristic of the valve. In this arrangement it is open to the designer so to determine this loss of head that within the expected range of viscosities the said loss of head either remains constant, or, for example, rises when the temperature rises. This latter would be a method of compensating for the above mentioned shortcomings of laminated leaf springs on motor vehicles.

Within the framework of the present invention it is also possible to leave a certain pre-determined portion of the total cross sectional area of the passages uncovered under normal circumstances by the other valve disc, thereby providing a pilot valve area.

In order to make a given valve assembly available for various damping ranges without replacement of components the valve disc provided with the passages can for example be so designed that within the framework of the invention it comprises two individual discs mounted one above the other which are so located with respect to each other, in the manner of a shutter, that the effective cross sectional area of the passages can be adjusted to any required value by a rotation of one of these individual discs with respect to the other.

Figure 2:
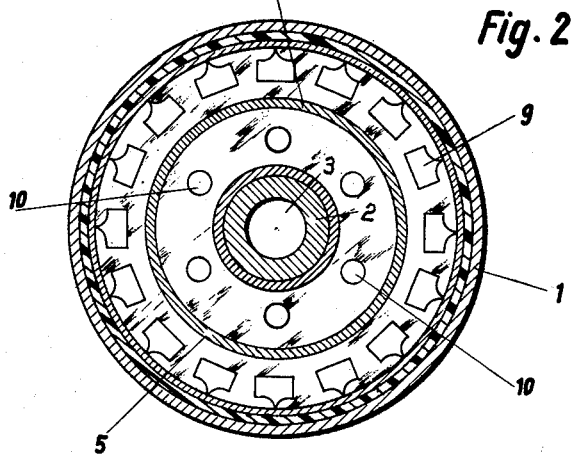
Figure 3:
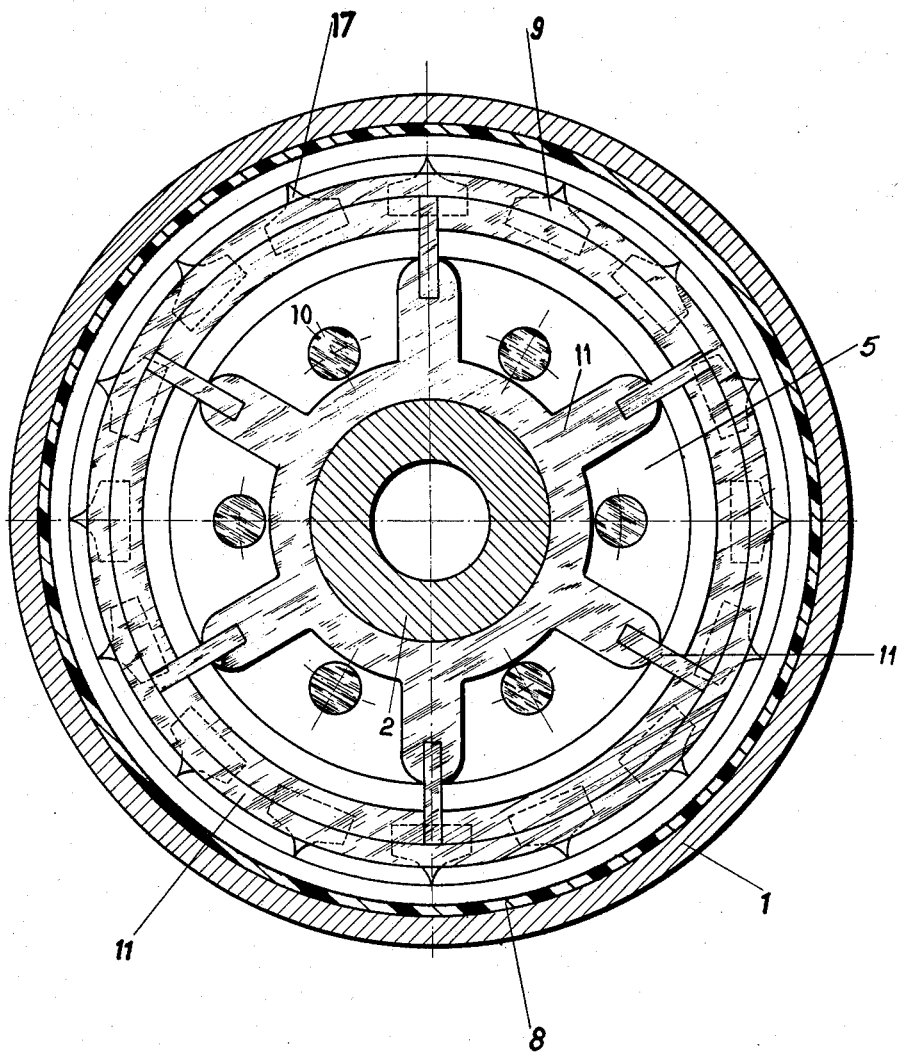

The invention will now be described with reference to the accompanying drawings in which one embodiment of the new valve control mechanism is shown in connection with a single tube shock absorber:

FIG. 1 shows the piston assembly of a single tube shock absorber and neighbouring components, partly in section;

FIG. 2 is a section on the line A—A of FIG. 1, and
FIG. 3 is a section on the line B—B of FIG. 1 on an enlarged scale,
FIG. 4 is a cross section of a part of the piston with the valve members therein taken on line IV—IV of FIG. 5 in the direction of the arrows,
FIG. 5 is a cross section of the part of FIG. 4 taken on line V—V in the direction of the arrows,
FIG. 6 is a plan view of the control disc,
FIG. 7 is a plan view of the valve disc showing the shaped holes and apertures, and
FIG. 8 is a plan view of the washer.

With reference to the accompanying drawing, a single tube hydraulic shock absorber includes a cylinder tube 1 and a piston rod 2. The piston rod 2 has a longitudinal passage 3 which is in communication with a compensating space (not shown) for the effect of the volume of the piston rod which is provided in the known manner at the head end of the actual shock absorber. The lower end of the passage 3 is closed.

At the end of the piston rod 2, a piston assembly is secured which as a whole is designated by K, FIG. 1, and which moves in the cylinder tube 1 of the hydraulic absorber and consists of two identical adjacent single pistons. The single parts of the single pistons are also arranged opposite each other so that for the same parts the same reference characters are applied and the opposite arrangements are thereby provided so that the reference characters of the parts of one as for example FIG. 1 as to the lower single piston which has the prime index on each part. Each single piston includes a valve disc 5 or 5' respectively of approximately S-shaped cross-section and made of metal, for example steel. The valve discs 5, 5' are rigidly connected with the piston rod 2 by means of the nut 6, using two star washers 7, 7' disposed between said discs and acting as spacers. The valve discs 5, 5' provide at the same time the seating for piston rings 8, 8'. The latter can for example consist of synthetic plastic material incorporating a lubricant such as molybdenum sulphide.

The said valve discs 5 and 5' contain two sets of passages, namely one set consisting of the shaped holes 9, 9' which form control openings and through which, upon operation of the piston body K, the control stream of the damping fluid flows and another set consisting of the apertures 10, 10' which are the main openings through which, upon operation of the piston body K, the main stream of the damping fluid flows.

The shaped holes 9, 9' are governed by control discs 11, 11' made preferably of a non-metallic material such as a synthetic plastic having a coefficient of thermal expansion which differs as much as practicable from that of the valve discs 5, 5'. These valve control discs 11, 11' are acted upon by compression springs 12, 12' so that they act as non-return valves when subjected to the pressure of the liquid.

The second set of the passages of the valve discs 5 and 5' consisting of the apertures 10, 10' is on the other hand controlled by flap valves 13, 13' which take the form of flat annular springs preferably made of bimetal, so that the flap valves 13, 13' will also operate in a simple manner in accordance with temperature variations.

The star washers 7, 7', which at the same time act as spacers, are provided with radial grooves 14, 15 so that the space between the valve discs 5, 5' is in communication with the longitudinal passage 3 of the piston rod 2, and thereby also with the compensating space of the shock absorber, by means of the radial grooves 14, 15 and piston rod orifices 16.

It will be seen from the above description and from the drawings that it is open to the designer to determine accurately the valve resistances and hence also the characteristic of the shock absorber within a wide range of temperature variation by suitable design of the controlling edges of the shaped holes 9, 9'. As can inter alia also be seen by reference to FIG. 3, the characteristically shaped holes provided there are such that a relatively small thermal expansion of the valve disc 55' and valve control discs 11, 11' will result in a very considerable and even discontinuous enlargement or reduction respectively of the area of the passages of the shaped holes 9, 9', so that as regards the characteristic of the damping produced by the shock absorber all practically possible requirements can be satisfied preserving the fully automatic operation of the valve arrangement. It is also possible to provide first running passages 17, 17' (FIG. 3) which can be arranged hydraulically in parallel with the apertures 10, 10' of the valve discs 5, 5', that is by the first operating passages 17, 17' a certain amount of fluid can flow from the upper chamber 20 to the lower chamber 19 and reversed.

The method of operation of the valve mechanism is as follows:

When the piston assembly K travels in the direction of the arrow 18, i.e. when the shock absorber contracts, the control disc 11' will—due to the effect of liquid pressure—be in contact with the valve disc 5', so that that portion of the shaped holes 9' will be open which corresponds to the pre-determined differences of diameters of these valve components having regard to the temperature obtaining at the time. Hence the design value of damping as pre-calculated for the mechanism will be obtained quite automatically. The pressure due to the liquid also opens the flap valve 13' so that the apertures 10' of the valve disc 5' will be free and the valve control disc 11 opens under the dynamic pressure of the liquid, so that the liquid can flow from the lower chamber 19 of the shock absorber to the upper chamber 20 in a main stream and control stream. The main stream flows through the apertures 10' of the valve disc 5' and the adjacent control stream flows through the passages of the uncovered portions of the shaped holes 9'. Both streams thus leave the piston bodies K through the disc 11. At the same time, part of the shock absorber liquid flows through the radial grooves 14, 15 and the piston rod orifices 16 to the longitudinal passage 3 inside the piston rod and from there to the compensating space (not shown). It is essential that this compensating space, in accordance with an earlier design proposed by the applicants, shall be located beyond the section of the valve with its attendant throttling effect, or in other words on the leeward side (low pressure side) of the shock absorber.

When the shock absorber extends (as shown by arrow 21) the mechanical action is similar but takes place in a reverse manner, under the influence of the pressure of the liquid in the upper chamber 20, the valve control disc 11 will contact valve disc 5 and thus closes the shaped holes 9 in that portion which will be covered by the control disc 11 but at least except for the first runnings passages 17, FIG. 3. Also the flap valve 13 will be opened by the pressure fluid and the valve control disc 11' will be lifted from the valve disc 5' during which time the flap valve 13' will close apertures 10'. The shock absorber fluid now flows out of upper chamber 20 into the lower chamber 19 through the apertures 10 and the passages of the shaped holes 9'. Now the amount of liquid necessary to compensate for the change in volume flows from the compensating space through the piston rod orifices 16 and the radial grooves 14, 15 back to the lower chamber 19 of the cylinder tube 1.

The shaped holes 9, 9' and also the apertures 10, 10' shown in FIGS. 2 and 3 can, as can also the whole design shown in the embodiment by way of example, be of different shape without departing from the essential features of the invention.

FIGS. 4 and 5 show the openings or passages 17 in the disc 22 and the openings or passages 23 and 24 in the disc 5. FIGS. 6 and 7 show the control disc 11 and the shaped holes and apertures 9 and 10 in the disc 5.

I claim:

1. A hydraulic shock absorber operable with temperature variations for controlling the relative movements of two members, comprising a substantially cylindrical casing secured to one of said members, said casing enclosing a working chamber containing a hydraulic damping fluid, a piston adapted to reciprocate in said working chamber, a piston rod fixed to said piston and connected to the other of said relatively reciprocating members, the piston comprising two identical and adjacent piston parts forming a piston assembly in the casing and each piston part having a valve disc and a valve control disc disposed in a plane by the side of and parallel to the valve disc, said discs having different coefficients of thermal expansion, and said valve disc being provided with shaped holes forming passages for the hydraulic fluid whose effective cross sectional areas are controlled by the valve control disc which covers at the same time all the shaped holes in the valve disc with different magnitudes of expansion of both discs in radial direction upon temperature variations, and a spring in each piston part to bear against the valve control disc so that the latter will act as a non-return valve when subjected to the pressure of the liquid.

2. Valve mechanism according to claim 1, in which the disc provided with the shaped holes is composed of metal, and the valve control disc is composed of a synthetic plastic material.

3. Valve mechanism according to claim 1, in which the holes of the valve disc are shaped in cross section so that at increasing temperature they are covered by the valve control disc in such a progressive manner that a constant loss of head of the liquid flowing through the valve is obtained.

4. Valve mechanism according to claim 1, in which the shaped holes of the valve disc have, in radial direction, outwardly directed portions which are shaped in cross section and located in such a manner that within the normal range of temperature variations they remain always uncovered by the valve control disc as first operating passages.

5. Valve mechanism according to claim 1, in which the valve disc comprises two individual valve disc members rotatably mounted one above the other and both provided with holes which are so shaped and located in such a manner that one disc can cover at least partly the shaped holes of the other but also the shaped holes of the one valve disc member can be made corresponding with the shaped holes of the other disc member by a rotation of one of the individual valve disc members with respect to the other, said individual valve disc members operating as a shutter in relation to one another so that the effective cross-sectional area of the passage through the shaped holes can be adjusted by the rotation of one of the individual valve disc members with respect to the other of the disc members.

6. Valve mechanism according to claim 1, in which the valve disc comprises two individual valve disc members rotatably mounted one above the other and both provided with holes which are so shaped and located in a manner that one disc can cover at least partly the shaped holes of the other but also the shaped holes of the one valve disc member can be made corresponding with the shaped holes of the other disc member by a rotation of one of the individual valve disc members with respect to the other, said individual valve disc members operating as a shutter in relation to one another that the effective cross-sectional area of the passage through the shaped holes can be adjusted by the rotation of one of the individual valve disc members with respect to the other disc member, and wherein the shaped holes of the one individual valve disc member which cooperates with the valve control disc have, in radial direction, outwardly directed portions which are shaped in cross section and located in such a manner that within the normal range of temperature variations they remain always uncovered by the valve control disc as first operating passages, and in which the shaped holes of the other individual valve disc member have, outwardly directed portions which are so shaped in cross section and located in such a manner that the first running passages of the said first disc member remain uncovered by the second disc member when the latter is so rotated respectively to the first disc member, that it covers the main portions of the shaped holes of the said first disc member.

7. Valve mechanism according to claim 1, in which the valve disc provided with the shaped holes and disposed in each of the two opposite adjacent pistons forming the piston assembly respectively is formed as an end plate of the piston assembly.

8. Valve mechanism according to claim 1, in which the valve disc provided with the shaped holes and disposed in each of the two opposite adjacent pistons forming the piston assembly respectively is formed as an end plate of the piston assembly, and is also respectively formed as a seating for piston rings sealing the piston against the cylinder casing.

9. A valve mechanism according to claim 1, in which the valve disc provided with the shaped holes has further passages provided as apertures each governed by means of a separate valve device.

10. A valve mechanism according to claim 1, in which the valve disc provided with the shaped holes has further passages provided as apertures each governed by means of a separate valve device, said valve device comprising a bi-metallic flat spring of annular shape whereby the individual layers of the two metals have different coefficients of thermal expansion.

11. A valve mechanism according to claim 1, in which the valve control disc has a projecting outer rim and in which the piston has a pressure spring which abuts against the said outer rim and the valve control disc abuts against the valve disc so that both discs can operate together as return valves.

12. Valve mechanism according to claim 1, in which the passages in the valve disc each have a pointed opening in the radial direction away from the center and which progressively diminish by means of curved border lines forming a part of the shaped hole passage in the disc.

References Cited in the file of this patent

UNITED STATES PATENTS

| | | |
|---|---|---|
| 967,285 | Wilson | Aug. 16, 1910 |
| 1,486,381 | Jaenichen | Mar. 11, 1924 |
| 1,883,514 | Boyer | Oct. 18, 1932 |
| 2,310,570 | Briggs | Feb. 9, 1943 |
| 2,683,505 | Girard | July 13, 1954 |
| 2,792,914 | Benard | May 21, 1957 |
| 2,821,268 | Carbon | Jan. 28, 1958 |
| 3,006,441 | Bliven et al. | Oct. 31, 1961 |

FOREIGN PATENTS

| | | |
|---|---|---|
| 1,147,944 | France | June 17, 1957 |
| 643,380 | Great Britain | Sept. 20, 1950 |

OTHER REFERENCES

German application 1,054,788, printed Apr. 9, 1959.